(12) United States Patent
Huang et al.

(10) Patent No.: US 9,146,606 B2
(45) Date of Patent: Sep. 29, 2015

(54) COMPUTER AND WAKING METHOD THEREOF

(71) Applicant: Wistron Corporation, New Taipei (TW)

(72) Inventors: I-Chih Huang, New Taipei (TW); Chia-Cheng Chuang, New Taipei (TW); Chih-Yung Chia, New Taipei (TW)

(73) Assignee: WISTRON CORPORATION, Taipei (TW)

( * ) Notice: Subject to any disclaimer, the term of this patent is extended or adjusted under 35 U.S.C. 154(b) by 207 days.

(21) Appl. No.: 14/071,749

(22) Filed: Nov. 5, 2013

(65) Prior Publication Data

US 2015/0006922 A1 Jan. 1, 2015

(30) Foreign Application Priority Data

Jul. 1, 2013 (TW) .............................. 102123479 A

(51) Int. Cl.
*G06F 1/32* (2006.01)
(52) U.S. Cl.
CPC ............ *G06F 1/3206* (2013.01); *G06F 1/3209* (2013.01); *G06F 1/3287* (2013.01)
(58) Field of Classification Search
CPC ... G06F 1/3206; G06F 1/3209; G06F 1/3287; G06F 1/266
See application file for complete search history.

(56) References Cited

U.S. PATENT DOCUMENTS

| | | | | |
|---|---|---|---|---|
| 6,571,341 | B1 * | 5/2003 | Forbes ......................... | 713/323 |
| 8,364,999 | B1 | 1/2013 | Adessa | |
| 2008/0307239 | A1 * | 12/2008 | Watanabe et al. ............. | 713/310 |
| 2011/0004778 | A1 * | 1/2011 | Tsukamoto et al. .......... | 713/324 |
| 2012/0042184 | A1 | 2/2012 | Yeh et al. | |
| 2014/0136869 | A1 * | 5/2014 | Sadowski et al. ............. | 713/323 |
| 2014/0181559 | A1 * | 6/2014 | Gough et al. ................. | 713/323 |
| 2014/0289442 | A1 * | 9/2014 | Tong et al. .................... | 710/310 |
| 2015/0095670 | A1 * | 4/2015 | Reddy et al. .................. | 713/320 |

FOREIGN PATENT DOCUMENTS

TW M412423 U1 9/2011

OTHER PUBLICATIONS

"Optimized Buffer Flush/Fill"; PCI-SIG Engineering Change Notice; Intel Corporation; Updated Apr. 30, 2009, original request: Feb. 8, 2008; pp. 1-16.
TW Office Action dated Nov. 24, 2014.
Partial English translation of TW Office Action dated Nov. 24, 2014.

* cited by examiner

*Primary Examiner* — Jaweed A Abbaszadeh
*Assistant Examiner* — Cheri Harrington
(74) *Attorney, Agent, or Firm* — McClure, Qualey & Rodack, LLP

(57) ABSTRACT

A computer and a waking method thereof are provided. The computer includes a switch circuit, a chipset, a peripheral component interconnect express (PCIE) device, and an embedded controller. The chipset includes a first wake-up pin and a power button pin, wherein the first wake-up pin is coupled to a terminal of the switch circuit. The PCIE device includes a second wake-up pin, and the embedded controller includes a general purpose input pin and a general purpose output pin. The general purpose input pin and the second wake-up pin are coupled to another terminal of the switch circuit. The general purpose output pin is coupled to the power button pin.

20 Claims, 4 Drawing Sheets

COMPUTER AND WAKING METHOD THEREOF

This application claims the benefit of Taiwan application Serial No. 102123479, filed Jul. 1, 2013, the subject matter of which is incorporated herein by reference.

BACKGROUND OF THE INVENTION

1. Field of the Invention

The invention relates in general to an electronic device, and more particularly to a computer and a waking method thereof.

2. Description of the Related Art

With the fast development of computers, the more functions the computer has, the much power the computer dissipates. Electricity waste may be easily made when the user does not put the computer into a power saving state as the user does not use the computer.

The standard of advanced configuration and power interface (ACPI) has defined a number of power states, including a working state S0, a standby state S3, and a shutdown state S5. When the computer is in the working state S0, all components of the computer are powered normally. When the computer is in the standby state S3, the remaining components, instead of the memory and the controllers which need to be powered to maintain the data, are not powered. When the computer is in the shutdown state S5, a standby power with a low power is maintained only, leading to that the power dissipation for the shutdown state S5 is lower than that for the standby state S3.

SUMMARY OF THE INVENTION

The invention is directed to a computer and a waking method thereof.

According to an embodiment, a computer is provided. The computer includes a switch circuit, a chipset, a peripheral component interconnect express (PCIE) device, and an embedded controller. The chipset includes a first wake-up pin and a power button pin, wherein the first wake-up pin is coupled to a terminal of the switch circuit. The PCIE device includes a second wake-up pin, and the embedded controller includes a general purpose input pin and a general purpose output pin. The general purpose input pin and the second wake-up pin are coupled to another terminal of the switch circuit. The general purpose output pin is coupled to the power button pin.

According to another embodiment, a waking method for a computer is provided. The computer includes a switch circuit, a chipset, a PCIE device, and an embedded controller. The chipset includes a first wake-up pin and a power button pin. The PCIE device includes a second wake-up pin, and the embedded controller includes a general purpose input pin and a general purpose output pin. The method includes the following. It is detected whether the computer is in a working state. When the computer is in the working state, the switch circuit is turned on and the chipset outputs a signal encoded using an opportunistic buffer flush/fill (OBFF) mechanism to the second wake-up pin through the first wake-up pin. When the computer is not in the working state, the switch circuit is turned off, the PCIE device outputs a wake-up event to the general purpose input through the second wake-up pin, and the embedded controller determined whether to wake up the computer according to the wake-up event and a system state. If it is determined to wake up the computer, a power button event is outputted to the power button pin through the general purpose output pin so that the power button pin of the chipset receives the power button event and the computer is woken up.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
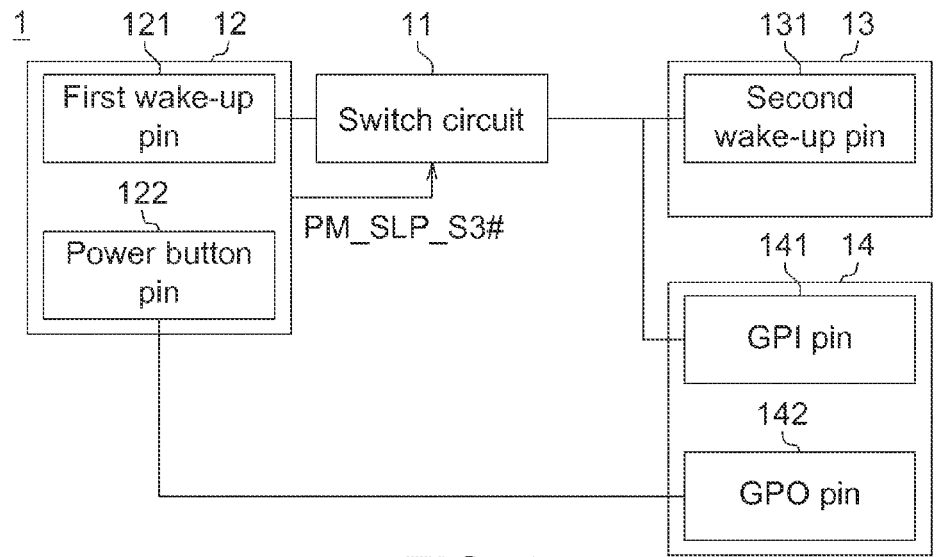
FIG. 1 is a block diagram illustrating a computer according to a first embodiment.

Referring to FIG. 1, a computer 1 is illustrated according to a first embodiment in a block diagram. The computer 1 includes a switch circuit 11, a chipset 12, a PCIE (Peripheral Component Interconnect Express) device 13 (which is a device compliant with a computer bus, such as PCIE), and an embedded controller (EC) 14. For the sake of explanation, a high speed switch is taken as an example of the switch circuit 11 of the first embodiment.

The chipset 12 is a south bridge chipset, for example, and the PCIE device 13 is a network card or WIFI module, for example. The chipset 12 includes a fist wake-up pin 121 and a power button pin 122, and the first wake-up pin 121 is connected to a terminal of the switch circuit 11. The PCIE device 13 includes a second wake-up pin 131. The embedded controller 14 includes a general purpose input (GPI) pin 141 and a general purpose output (GPO) pin 142. The GPI 141 and the second wake-up pin 131 are connected to another terminal of the switch circuit 11, and the GPO 141 is connected to the power button pin 122. The switch circuit 11 is controlled by, for example, a state signal PM_SLP_S3# outputted by the chipset 12. When the computer 1 is in a working state S0, the state signal PM_SLP_S3# is in a high level. Conversely, when the computer 1 is not in the working state S0, the state signal PM_SLP_S3# is in a low level. For example, when the computer 1 is not in the working state S0, the computer 1 is in a standby state S3 or a shutdown state S5.

Figure 2:
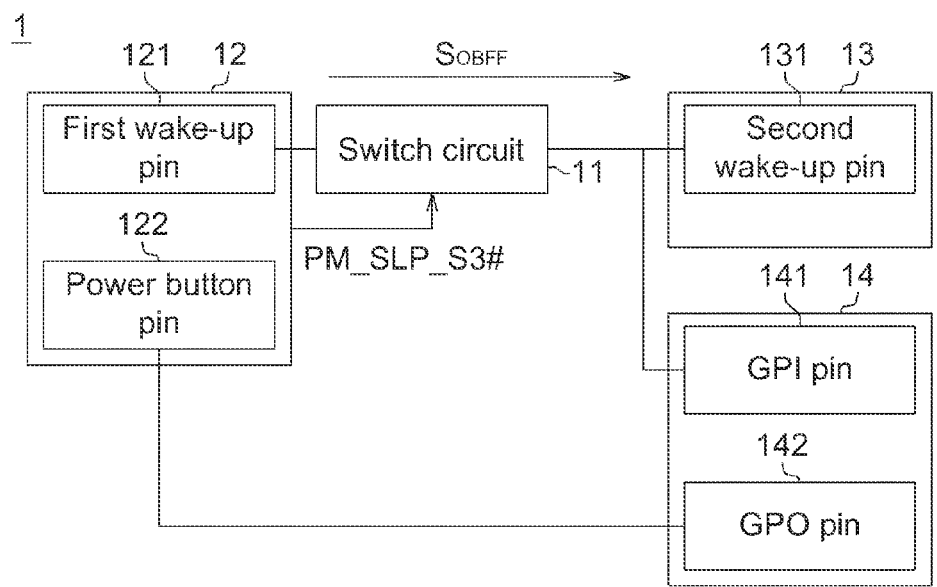
FIG. 2 illustrates the computer according to the first embodiment operating in a working state.

FIG. 2 illustrates the computer according to the first embodiment operating in a working state. Since reduced power consumption and extended battery life are needed as the technology progresses, the PCI-SIG association specifically establishes an opportunistic buffer flush/fill (OBFF) mechanism. The OBFF mechanism is that a buffer for buffering data is built in a PCIE device, waiting for an appropriate time to send the buffered data to the chipset 12 instead of sending data, as soon as received by the PCIE device 13, to the chipset 12. In this manner, using the OBFF mechanism, the chipset 12 has more opportunity to enter a power saving mode to improve the power saving effects.

When the computer 1 is in a working state S0, the chipset 12 sets the first wake-up pin 121 to an output pin. When the computer 1 is in the working state S0, the switch circuit 11 is turned on, the chipset 12 outputs a signal encoded using the OBFF mechanism, denoted by $S_{OBFF}$, from the first wake-up pin 121 to the second wake-up pin 131, and the embedded controller 14 is required to ignore the signal $S_{OBFF}$. In the working state S0, the chipset 12 communicates with the PCIE device 13 by using the signal $S_{OBFF}$. The chipset 12 sends its status to the PCIE device 13 through the signal $S_{OBFF}$, and further provides an appropriate time (e.g., CPU active) so that the PCIE device 13 sends data from its internal buffer to the chipset 12. In an inappropriate time (e.g., CPU sleep), the data are buffered in the internal buffer of the PCIE device 13 so that the CPU can be in the sleep state much more time to achieve the effects of power saving.

Figure 3:
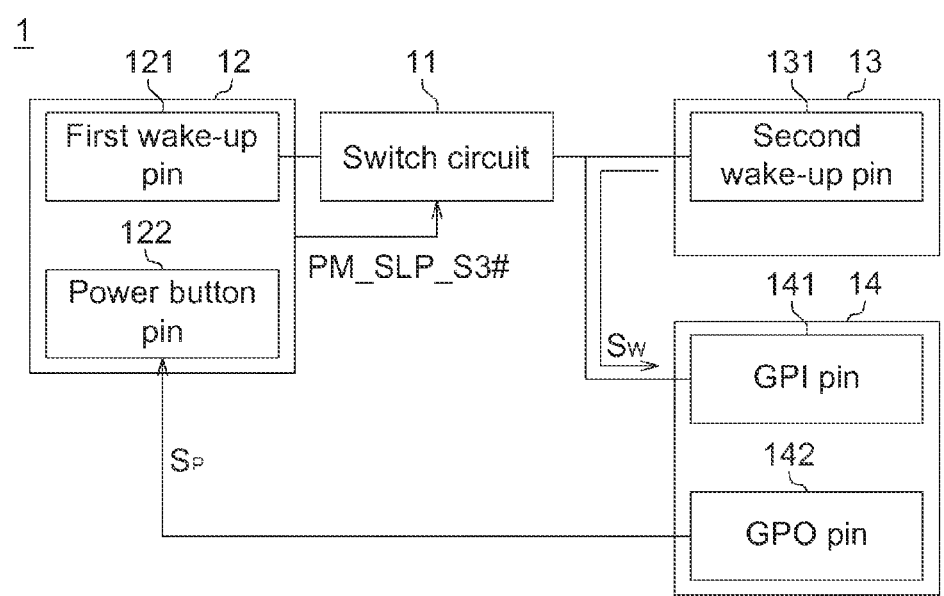
FIG. 3 illustrates the computer according to the first embodiment not in the working state.

FIG. 3 illustrates the computer according to the first embodiment not in the working state. When the computer 1 is not in the working state S0, the chipset 12 sets the first wake-up pin 121 to an output pin. When the computer 1 is not in the working state S0, the switch circuit 11 is turned off, and the PCIE device 13 outputs a wake-up event Sw from the second wake-up pin 131 to the GPI pin 141. The embedded controller 14 determines whether to wake up the computer 1 according to the wake-up event Sw and a system state. When it needs to wake up the computer 1, the embedded controller 14 outputs a power button event Sp from the GPO pin 142 to the power button pin 122. The computer 1 is woken up after the power button pin 122 of the chipset 12 receives the power button event Sp.

For example, the system state is an amount of battery capacity for the system in a battery mode. The embedded controller 14 first determines whether the battery capacity is sufficient. When the battery capacity is sufficient, the embedded controller 14 outputs the power button event Sp to wake up the chipset 12. In addition, the system state may indicate the temperature of the system. In another example, the system state may indicate whether a new wireless station is detected if the computer 1 supports Intel smart connect technology. In a net detect mode, the PCIE device 13 outputs a wake-up event Sw from the second wake-up pin 131 to the GPI pin 141. The embedded controller 14 determines whether to wake up the chipset 12 according to the wake-up event Sw and the system temperature. If it is determined to wake it up, the embedded controller 14 outputs a power button event Sp from the GPO pin 142 to the power button pin 122 so as to wake up the chipset 12 to update data.

Figure 4:
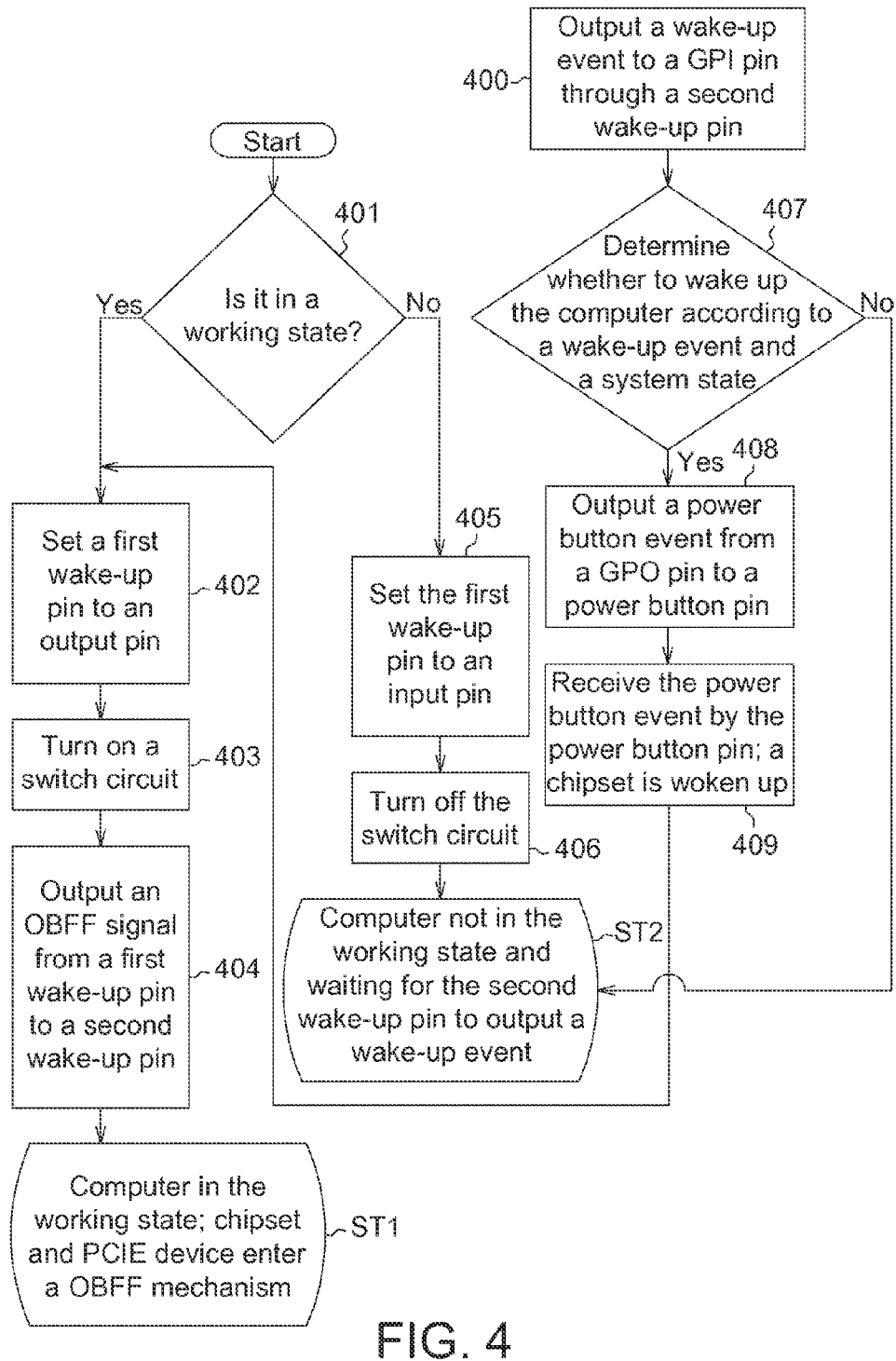
FIG. 4 is a flowchart illustrating a waking method according to the first embodiment.

Referring to FIGS. 2, 3, and 4, FIG. 4 is a flowchart illustrating a waking method according to the first embodiment. The waking method for the computer 1 includes the steps as follows. First, in step 401, the chipset 12 determines whether the computer 1 is in a working state S0. If the computer 1 is in the working state S0, step 402 is performed. In step 402, the chipset 402 sets a first wake-up pin 121 to an output pin. In step 403, the chipset 12 then controls the switch circuit 11 to be turned on. After that, in step 404, the chipset 12 outputs a signal encoded using the OBFF mechanism, denoted by $S_{OBFF}$ or OBFF signal, from the first wake-up pin 121 to the second wake-up pin 131, and the embedded controller 14 ignores the signal $S_{OBFF}$. Then, a state ST1 is maintained. As indicated by the state ST1, the computer 1 is in the working state S0, and the chipset 12 and the PCIE device 13 enter the OBFF mechanism.

Conversely, if the computer 1 is not in the working state S0, step 405 is performed. In step 405, the chipset 12 sets the first wake-up pin 121 to an input pin. After that, in step 406, the chipset 12 controls the switch circuit 11 to be turned off Afterwards, the state ST2 is maintained. As indicated by the state ST2, the computer is not in the working state S0, and waits for the second wake-up pin 131 to output a wake-up event Sw.

If the PCIE device 13 generates a wake-up event Sw, the PCIE device 13 outputs the wake-up event to the GPI pin 141 through the second wake-up pin 131, as shown in step 400. In step 407, the embedded controller 14 then determines whether to wake up the computer 1 according to the wake-up event Sw and the system state. When it is determined not to wake up the computer the state ST2 is maintained. Conversely, when it is determined to wake up the computer 1, step 408 is performed. In step 408, the embedded controller 14 outputs a power button event Sp from the GPO pin 142 to the power button pin 122. After that, in step 409, the power button pin 122 receives the power button event Sp, and the computer 1 is woken up. Steps 402-404 are then performed again, and the state ST1 is entered finally.

Second Embodiment

Figure 5:
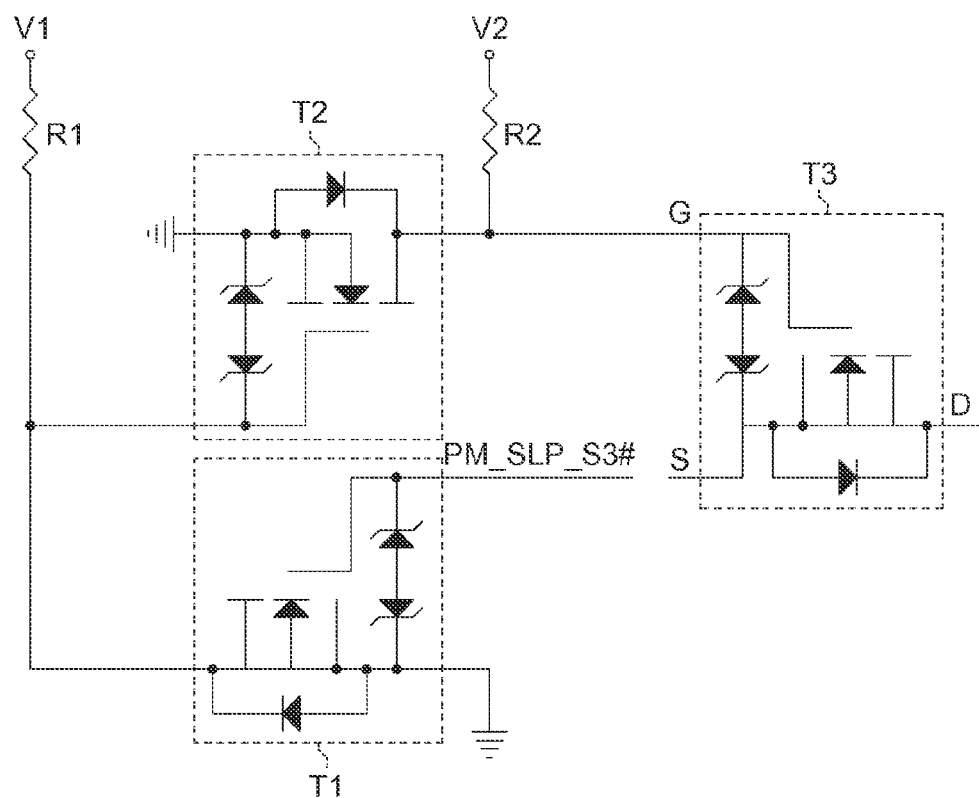
FIG. 5 is a circuit diagram illustrating a switch circuit according to a second embodiment.

Referring to FIGS. 1 and 5, FIG. 5 is a circuit diagram illustrating a switch circuit according to a second embodiment. The second embodiment differs from the embodiment in that the second embodiment substitutes a switch circuit 21 for the high speed switch in the first embodiment. The switch circuit 21 includes resistors R1, R2, transistors T1, T2, and T3. A first terminal of the first resistor R1 receives a first working voltage V1, and a first terminal of the first transistor T1 is coupled to a second terminal of the first resistor. A second terminal of the first transistor T1 is coupled to a ground, and a control terminal of the first transistor T1 receives a state signal PM_SLP_S3#.

A first terminal of the second resistor R2 receives a second working voltage V2, which is required to be a voltage making the third transistor T3 conduct regardless of whether the first terminal of the third transistor T3 is supplied by a high or low voltage. A first terminal of the second transistor T2 is coupled to the ground. A second terminal of the second transistor T2 is coupled to the second terminal of the second resistor R2, and a control terminal of the second transistor T2 is coupled to the second terminal of the first resistor R1. A control terminal of the third transistor T3 is coupled to the second terminal of the second resistor R2, a first terminal of the third transistor T3 is coupled to the second wake-up pin 131, and a second terminal of the third transistor T3 is coupled to the first wake-up pin 121.

When the computer 1 is in the working state S0, state signal PM_SLP_S3# turns on the first transistor T1, the first transistor T1 cuts off the second transistor 12, turning on the third transistor T3. The third transistor T3 electrically couples the first wake-up pin 121 to the second wake-up pin 131. Specifically, for example, when the computer 1 is in the working state S0, the state signal PM_SLP_S3# is in a high level for turning on the first transistor T1. When the first transistor T1 is turned on, the first transistor T1 connects the control terminal of the second transistor T2 to the ground to cut off the second transistor T2. After the second transistor T2 is cut off, the third transistor T3 is turned on, controlled by the second working voltage V2 so as to electrically connect the first wake-up pin 121 and the second wake-up pin 131.

Conversely, when the computer 1 is in the standby state S3 or the shutdown state S5, the state signal PM_SLP_S3# is in a low level to cut off the first transistor T1. After the first transistor T1 is cut off, the second transistor T2 is turned on, controlled by the first working voltage V1, After the second transistor T2 is turned on, the second transistor T2 electrically couples the control terminal of the third transistor T3 to the ground so as to cut off the third transistor T3. The manufacturing cost can be then further reduced since the switch circuit 21 is implemented by using the resistors R1, R2, transistors T1, T2, and T3.

In the working state S0, the computer and the waking method therefor can output an OBFF signal to the PCIE device through the first wake-up pin of the chipset, and provide an appropriate time for the PCIE device to send data from its internal buffer to the chipset. When the computer is in the standby state S3 or the shutdown state S5, the PCIE device outputs a wake-up event from the second wake-up pin to the GPI pin. If it needs to wake up the computer, the embedded controller outputs a power button event from the GPO pin to the power button pin to wake up the chipset.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A computer, comprising:
   a switch circuit;
   a chipset, comprising:
      a first wake-up pin, coupled to a terminal of the switch circuit; and
      a power button pin;
   a peripheral component interconnect express (PCIE) device, comprising:
      a second wake-up pin; and
   an embedded controller, comprising:
      a general purpose input pin, wherein the second wake-up pin and the general purpose input pin are coupled to another terminal of the switch circuit; and
      a general purpose output pin, coupled to the power button pin.

2. The computer according to claim 1, wherein when the computer is in a working state, the switch circuit turns on, the chipset outputs a signal encoded using an opportunistic buffer flush/fill (OBFF) mechanism to the second wake-up pin through the first wake-up pin.

3. The computer according to claim 2, wherein when the computer is not in the working state, the switch circuit turns off, the PCIE device outputs a wake-up event to the general purpose input through the second wake-up pin, the embedded controller determines whether to wake up the computer according to the wake-up event and a system state, and outputs, if it is determined to wake up the computer, a power button event to the power button pin through the general purpose output pin so that the power button pin of the chipset receives the power button event and the computer is woken up.

4. The computer according to claim 3, wherein when the computer is not in the working state, the chipset sets the first wake-up pin to an input pin; and when the computer is in the working state, the chipset sets the first wake-up pin to an output pin.

5. The computer according to claim 4, wherein when the computer is in the working state, the embedded controller ignores the signal encoded using the OBFF mechanism.

6. The computer according to claim 5, wherein when the computer is not in the working state, the computer is in a standby state (S3) or a shutdown state (S5).

7. The computer according to claim 2, wherein when the computer is in the working state, the embedded controller ignores the signal encoded using the OBFF mechanism.

8. The computer according to claim 7, wherein when the computer is in the working state, the chipset sets the first wake-up pin to an output pin.

9. The computer according to claim 1, wherein when the computer is not in the working state, the switch circuit turns off, the PCIE device outputs a wake-up event to the general purpose input through the second wake-up pin, the embedded controller outputs a power button event to the power button pin according to the wake-up event and a system state through the general purpose output pin.

10. The computer according to claim 9, wherein when the computer is not in the working state, the chipset sets the first wake-up pin to an input pin.

11. The computer according to claim 9, wherein the computer is not in the working state, the computer is in a standby state or a shutdown state.

12. The computer according to claim 1, wherein the switch circuit comprises:
   a first resistor having a first terminal and a second terminal, wherein the first terminal of the first resistor receives a first working voltage;
   a first transistor having a first, a second terminal, and a control terminal, wherein the first terminal of the first transistor is coupled to the second terminal of the first resistor, the second terminal of the first transistor is coupled to a ground, and the control terminal of the first transistor receives a state signal;
   a second resistor having a first terminal and a second terminal, wherein the first terminal of the second resistor receives a second working voltage;
   a second transistor having a first terminal, a second terminal, and a control terminal, wherein the first terminal of the second transistor is coupled to the ground, the second terminal of the second transistor is coupled to the second terminal of the second resistor, and the control terminal of the second transistor is coupled to the second terminal of the first resistor; and
   a third transistor having a first terminal, a second terminal, and a control terminal, wherein the control terminal of the third transistor is coupled to the second terminal of the second resistor, the first terminal of the third transistor is coupled to the second wake-up pin, the second terminal of the third transistor is coupled to the first wake-up pin.

13. The computer according to claim 12, wherein when the computer is in a working state, the state signal turns on the first transistor and the first transistor cuts off the second transistor so as to turn on the third transistor.

14. A waking method for a computer, the computer including a switch circuit, a chipset, a peripheral component interconnect express (PCE) device, and an embedded controller, the chipset including a first wake-up pin and a power button pin, the PCE device including a second wake-up pin, and an embedded controller including a general purpose input pin, and a general purpose output pin, the waking method comprising the steps of:
   detecting whether the computer is in a working state;
   when the computer is in the working state, turning on the switch circuit and outputting, by the chipset, a signal encoded using an opportunistic buffer flushfill (OBFF) mechanism to the second wake-up pin through the first wake-up pin;
   when the computer is not in the working state, turning off the switch circuit, outputting, by the PCE device, a wake-up event to the general purpose input through the second wake-up pin, and determining, by the embedded controller, whether to wake up the computer according to the wake-up event and a system state;

if it is determined to wake up the computer, outputting a power button event to the power button pin through the general purpose output pin so that the power button pin of the chipset receives the power button event and the computer is woken up.

15. The waking method according to claim 14, wherein when the computer is not in the working state, the chipset sets the first wake-up pin to an input pin.

16. The waking method according to claim 15, wherein when the computer is in the working state, the chipset sets the first wake-up pin to an output pin.

17. The waking method according to claim 16, wherein when the computer is in the working state, the embedded controller ignores the signal encoded using the OBFF mechanism.

18. The waking method according to claim 17, wherein when the computer is not in the working state, the computer is in a standby state (S3) or a shutdown state (S5).

19. The waking method according to claim 14, wherein when the computer is in the working state, the embedded controller ignores the signal encoded using the OBFF mechanism.

20. The waking method according to claim 14, wherein when the computer is not in the working state, the computer is in a standby state (S3) or a shutdown state (S5).

* * * * *